US012799837B2

(12) United States Patent
Greci et al.

(10) Patent No.: US 12,799,837 B2
(45) Date of Patent: Nov. 17, 2026

(54) EXPANDABLE METAL SEALANT WELLBORE CASING PATCH

(71) Applicant: Halliburton Energy Services, Inc., Houston, TX (US)

(72) Inventors: Stephen Michael Greci, Little Elm, TX (US); Michael Linley Fripp, Carrollton, TX (US); Rutger Evers, Addison, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 881 days.

(21) Appl. No.: 16/964,430

(22) PCT Filed: Aug. 21, 2019

(86) PCT No.: PCT/US2019/047529
§ 371 (c)(1),
(2) Date: Jul. 23, 2020

(87) PCT Pub. No.: WO2021/034325
PCT Pub. Date: Feb. 25, 2021

(65) Prior Publication Data
US 2023/0243224 A1 Aug. 3, 2023

(51) Int. Cl.
*E21B 29/10* (2006.01)
*C09K 8/516* (2006.01)

(52) U.S. Cl.
CPC .............. *E21B 29/10* (2013.01); *C09K 8/516* (2013.01)

(58) Field of Classification Search
None
See application file for complete search history.

(56) References Cited

U.S. PATENT DOCUMENTS 1,982,569 A 11/1934 Byrd
3,018,830 A 1/1962 Springer
(Continued)

FOREIGN PATENT DOCUMENTS

CA 2751473 A1 8/2010
CA 2751473 C 9/2014
(Continued)

OTHER PUBLICATIONS

Written Opinion & Search Report in SG Application No. 11202112174W, dated Jul. 24, 2023.
(Continued)

*Primary Examiner* — Anuradha Ahuja
(74) *Attorney, Agent, or Firm* — The Hilton Firm PLLC

(57) ABSTRACT

A metal patch for patching a downhole well casing comprises a metal sealant having a shape congruent with a section of the downhole well casing and transition-able from a first state to a second state. The metal sealant expands and hardens in response to hydrolysis. The metal sealant is one of an alkaline earth metal, a transition metal, and a metal oxide. The metal sealant can be one of an alkaline earth metal, a transition metal, and a metal oxide and at least one alloy, wherein the at least one alloy is selected from a group consisting of Al, Zn, Mn, Zr, Y, Nd, Gd, Ag, Ca, Sn, and RE. The at least one alloy can be alloyed with a dopant that promotes corrosion, such as Ni, Fe, Cu, Co, Ir, Au, and Pd. The at least one alloy can be alloyed with a dopant that inhibits passivation.

4 Claims, 4 Drawing Sheets

(56) References Cited

U.S. PATENT DOCUMENTS 3,046,601 A 7/1962 Hubbert et al.
3,175,618 A 3/1965 Lang
3,385,367 A 5/1968 Kollsman
3,993,577 A 11/1976 Black
4,445,694 A 5/1984 Flaherty
4,612,985 A 9/1986 Rubbo et al.
4,846,278 A 7/1989 Robbins
5,070,942 A 12/1991 McInnes
5,139,235 A 8/1992 Kilmer
5,163,321 A 11/1992 Perales
5,803,177 A 9/1998 Hriscu et al.
6,050,336 A 4/2000 Willauer et al.
6,098,717 A 8/2000 Bailey et al.
6,321,861 B1 11/2001 Leichter
6,367,845 B1 4/2002 Otten et al.
6,581,682 B1 6/2003 Parent et al.
6,640,893 B1 11/2003 Rummel et al.
6,695,061 B2 2/2004 Fripp et al.
7,007,910 B1 3/2006 Krinner et al.
7,040,404 B2 5/2006 Brothers et al.
7,387,158 B2 6/2008 Murray et al.
7,431,082 B2 10/2008 Holt et al.
7,543,639 B2 6/2009 Emerson
7,562,704 B2 7/2009 Wood et al.
7,578,347 B2 8/2009 Bosma et al.
7,591,319 B2 9/2009 Xu
7,909,110 B2 3/2011 Sharma et al.
7,931,079 B2 4/2011 Nicholson
7,984,762 B2 7/2011 Renshaw et al.
8,083,000 B2 12/2011 Nutley et al.
8,086,000 B2 12/2011 Weijers et al.
8,235,075 B2 * 8/2012 Saltel ...................... E21B 29/10
166/212
8,240,377 B2 8/2012 Kulakofsky et al.
8,434,571 B2 5/2013 Kannan et al.
8,443,881 B2 5/2013 Thomson et al.
8,490,707 B2 7/2013 Robisson et al.
8,499,843 B2 8/2013 Patel et al.
8,776,899 B2 7/2014 Fripp et al.
9,033,046 B2 5/2015 Andrew et al.
9,091,133 B2 7/2015 Stewart et al.
9,133,683 B2 9/2015 Pyer et al.
9,404,030 B2 8/2016 Mazyar et al.
9,518,453 B2 12/2016 Dilber et al.
9,605,508 B2 3/2017 Xu et al.
9,624,752 B2 4/2017 Resink
9,702,029 B2 7/2017 Fripp
9,725,979 B2 8/2017 Mazyar et al.
9,745,451 B2 8/2017 Zhao et al.
9,856,710 B2 1/2018 Zhu et al.
9,869,152 B2 1/2018 Gamstedt et al.
9,976,380 B2 5/2018 Davis et al.
10,119,011 B2 11/2018 Zhao et al.
10,364,636 B2 7/2019 Davis et al.
10,428,624 B2 10/2019 Vasques
10,704,362 B2 7/2020 Themig et al.
10,851,615 B2 12/2020 Watson et al.
10,961,804 B1 3/2021 Fripp et al.
2002/0074740 A1 6/2002 Quoiani
2002/0125008 A1 9/2002 Wetzel et al.
2003/0150614 A1 8/2003 Brown et al.
2003/0159829 A1 8/2003 Fripp et al.
2004/0118572 A1 6/2004 Whanger et al.
2004/0149418 A1 8/2004 Bosma et al.
2004/0173361 A1 9/2004 Lohbeck
2004/0244994 A1 12/2004 Jackson et al.
2005/0039927 A1 2/2005 Wetzel et al.
2005/0092485 A1 5/2005 Brezinski et al.
2005/0171248 A1 8/2005 Li et al.
2005/0199401 A1 9/2005 Patel et al.
2005/0257961 A1 11/2005 Snell et al.
2006/0039927 A1 2/2006 Aoki et al.
2006/0175065 A1 8/2006 Ross
2007/0089911 A1 4/2007 Moyes
2007/0095532 A1 5/2007 Head et al.
2007/0125532 A1 6/2007 Murray et al.
2007/0200299 A1 8/2007 Kunz
2007/0221374 A1 9/2007 Filippov et al.
2007/0257405 A1 11/2007 Freyer
2008/0066931 A1 3/2008 Xu
2008/0099209 A1 5/2008 Loretz et al.
2008/0142214 A1 6/2008 Keller
2008/0149351 A1 6/2008 Marya et al.
2008/0185150 A1 8/2008 Brown
2008/0185158 A1 8/2008 Chalker et al.
2008/0194717 A1 8/2008 Vaidya et al.
2008/0220991 A1 9/2008 Slay et al.
2008/0251250 A1 10/2008 Brezinski et al.
2009/0020286 A1 1/2009 Johnson
2009/0120640 A1 5/2009 Kulakofsky et al.
2009/0130938 A1 5/2009 Xu et al.
2009/0173505 A1 7/2009 Patel et al.
2009/0179383 A1 7/2009 Koloy et al.
2009/0188569 A1 7/2009 Saltel
2009/0242189 A1 10/2009 Vaidya et al.
2009/0242214 A1 10/2009 Foster et al.
2009/0272546 A1 11/2009 Nutley et al.
2009/0277651 A1 11/2009 Kilgore
2009/0277652 A1 11/2009 Nutley et al.
2010/0038074 A1 2/2010 Patel
2010/0139930 A1 6/2010 Patel et al.
2010/0147535 A1 6/2010 Gorrara et al.
2010/0163252 A1 7/2010 Regnault De La Mothe et al.
2010/0212891 A1 8/2010 Stewart et al.
2010/0243276 A1 9/2010 King
2010/0270031 A1 10/2010 Patel
2010/0307770 A1 12/2010 Sponchia et al.
2011/0042081 A1 2/2011 Streich et al.
2011/0073310 A1 3/2011 Clemens
2011/0098202 A1 4/2011 James et al.
2011/0174504 A1 7/2011 Wright et al.
2011/0226374 A1 9/2011 Kalman
2011/0252879 A1 10/2011 Madhavan et al.
2011/0253393 A1 10/2011 Vaidya et al.
2012/0006530 A1 1/2012 Crabb et al.
2012/0055667 A1 3/2012 Ingram et al.
2012/0073834 A1 3/2012 Lembcke
2012/0125630 A1 5/2012 Sevre
2012/0132427 A1 5/2012 Renshaw et al.
2012/0175134 A1 7/2012 Robisson et al.
2012/0205091 A1 8/2012 Turley
2012/0205092 A1 8/2012 Givens et al.
2012/0272546 A1 11/2012 Tsai
2012/0292013 A1 11/2012 Munshi et al.
2012/0292023 A1 11/2012 Hinkie et al.
2012/0318513 A1 12/2012 Mazyar et al.
2013/0056196 A1 3/2013 Hench
2013/0056207 A1 3/2013 Wood et al.
2013/0056209 A1 3/2013 Mazyar
2013/0056227 A1 3/2013 Sponchia
2013/0056228 A1 3/2013 Gruetzmann et al.
2013/0146312 A1 6/2013 Gerrard et al.
2013/0213032 A1 8/2013 Xu et al.
2013/0248179 A1 9/2013 Yeh et al.
2014/0051612 A1 2/2014 Mazyar et al.
2014/0054047 A1 2/2014 Zhou
2014/0060815 A1 3/2014 Wang et al.
2014/0102728 A1 4/2014 Gamstedt et al.
2014/0231086 A1 8/2014 Jamison et al.
2014/0238692 A1 8/2014 Watson
2014/0251641 A1 9/2014 Marya et al.
2014/0262351 A1 9/2014 Derby
2014/0311741 A1 10/2014 Tunget
2014/0318780 A1 10/2014 Howard
2014/0354443 A1 12/2014 Roberson et al.
2014/0361497 A1 12/2014 Porta
2015/0021044 A1 1/2015 Davis et al.
2015/0060064 A1 3/2015 Lafferty et al.
2015/0101813 A1 4/2015 Zhao et al.
2015/0199401 A1 7/2015 Polehn et al.
2015/0233215 A1 8/2015 Yeh et al.
2015/0267501 A1 9/2015 Al-Gouhi
2015/0275644 A1 10/2015 Chen et al.
2015/0308214 A1 10/2015 Bilansky et al.

(56) References Cited

U.S. PATENT DOCUMENTS

| | | | |
|---|---|---|---|
| 2015/0344772 | A1 | 12/2015 | Droger et al. |
| 2015/0369027 | A1 | 12/2015 | Jones et al. |
| 2016/0032696 | A1 | 2/2016 | Caccialupi et al. |
| 2016/0047177 | A1 | 2/2016 | Martin et al. |
| 2016/0097252 | A1 | 4/2016 | Resink |
| 2016/0137912 | A1 | 5/2016 | Sherman et al. |
| 2016/0138359 | A1 | 5/2016 | Zhao et al. |
| 2016/0145965 | A1 | 5/2016 | Zhao et al. |
| 2016/0194933 | A1 | 7/2016 | O'Brien et al. |
| 2016/0201425 | A1 | 7/2016 | Walton et al. |
| 2016/0215604 | A1 | 7/2016 | Potapenko |
| 2016/0230495 | A1 | 8/2016 | Mazyar et al. |
| 2016/0273299 | A1 | 9/2016 | Fripp et al. |
| 2016/0312586 | A1 | 10/2016 | Declute-Melancon |
| 2016/0319633 | A1 | 11/2016 | Cooper et al. |
| 2016/0326829 | A1 | 11/2016 | Dolog et al. |
| 2016/0326830 | A1 | 11/2016 | Hallundbaek |
| 2016/0376869 | A1 | 12/2016 | Rochen et al. |
| 2016/0376870 | A1 | 12/2016 | Roselier et al. |
| 2017/0122062 | A1 | 5/2017 | Freyer |
| 2017/0191343 | A1 | 7/2017 | Solhaug |
| 2017/0234103 | A1 | 8/2017 | Frazier |
| 2017/0261137 | A1 | 9/2017 | Williams et al. |
| 2017/0335673 | A1 | 11/2017 | Burke et al. |
| 2018/0078998 | A1 | 3/2018 | Sherman |
| 2018/0085154 | A1 | 3/2018 | Kulper et al. |
| 2018/0087346 | A1 | 3/2018 | Rochen |
| 2018/0087350 | A1 | 3/2018 | Sherman |
| 2018/0094492 | A1 | 4/2018 | Knapp et al. |
| 2018/0202271 | A1 | 7/2018 | Semple et al. |
| 2018/0216431 | A1 | 8/2018 | Walton, III et al. |
| 2018/0230772 | A1 | 8/2018 | Brandsdal et al. |
| 2018/0245420 | A1 | 8/2018 | Ringgenberg |
| 2018/0266215 | A1 | 9/2018 | Fagley, IV et al. |
| 2018/0320472 | A1 | 11/2018 | Fripp |
| 2018/0355691 | A1* | 12/2018 | Andersen .............. E21B 43/105 |
| 2018/0355693 | A1 | 12/2018 | Al-Abduljabbar et al. |
| 2018/0362415 | A1 | 12/2018 | Doud et al. |
| 2019/0017285 | A1 | 1/2019 | Kain |
| 2019/0040721 | A1 | 2/2019 | Kohn et al. |
| 2019/0048673 | A1 | 2/2019 | Knight et al. |
| 2019/0048680 | A1 | 2/2019 | Stein et al. |
| 2019/0055808 | A1 | 2/2019 | Kruger |
| 2019/0055839 | A1 | 2/2019 | Skillingstad et al. |
| 2019/0128074 | A1 | 5/2019 | Stokes et al. |
| 2019/0153852 | A1 | 5/2019 | Lallemand et al. |
| 2019/0203101 | A1 | 7/2019 | Dusterhoft et al. |
| 2019/0249509 | A1 | 8/2019 | Jakkula et al. |
| 2019/0264543 | A1* | 8/2019 | Sherman ............... F16L 55/163 |
| 2019/0316025 | A1 | 10/2019 | Sherman et al. |
| 2019/0360297 | A1 | 11/2019 | Heiman et al. |
| 2020/0240235 | A1 | 7/2020 | Fripp et al. |
| 2020/0325749 | A1 | 10/2020 | Fripp et al. |
| 2020/0370391 | A1 | 11/2020 | Fripp et al. |
| 2021/0017441 | A1 | 1/2021 | Fripp et al. |
| 2021/0032980 | A1 | 2/2021 | Fripp et al. |
| 2021/0040810 | A1 | 2/2021 | Evers |
| 2021/0079756 | A1 | 3/2021 | Ornelaz et al. |
| 2021/0115750 | A1 | 4/2021 | Fripp |
| 2021/0140255 | A1 | 5/2021 | Greci et al. |
| 2021/0189817 | A1 | 6/2021 | Fripp et al. |
| 2021/0230982 | A1 | 7/2021 | Bogardus et al. |
| 2021/0332659 | A1 | 10/2021 | Fripp et al. |
| 2021/0353037 | A1 | 11/2021 | Cote |
| 2022/0074221 | A1 | 3/2022 | Laimbeer et al. |
| 2024/0191605 | A1 | 6/2024 | Newton |

FOREIGN PATENT DOCUMENTS

| | | | |
|---|---|---|---|
| CA | 3085547 | A1 | 8/2019 |
| CN | 1708631 | A | 12/2005 |
| CN | 102027189 | A | 4/2011 |
| CN | 104583530 | A | 4/2015 |
| CN | 105121777 | B | 12/2015 |
| CN | 105422146 | A | 3/2016 |
| CN | 106522923 | A | 3/2017 |
| CN | 107148444 | A | 9/2017 |
| CN | 107250321 | A | 10/2017 |
| CN | 107532466 | A | 1/2018 |
| DE | 323840 | C | 8/1920 |
| DE | 323842 | C | 8/1920 |
| EP | 1067320 | A2 | 1/2001 |
| EP | of2399000 | A2 | 12/2011 |
| EP | 2466064 | A1 | 6/2012 |
| EP | 2217790 | B1 | 10/2016 |
| EP | 2753791 | B1 | 6/2017 |
| FR | 3073549 | A1 | 5/2019 |
| GB | 2381278 | A | 4/2003 |
| GB | 2416796 | A | 2/2006 |
| GB | 2469723 | A | 10/2010 |
| GB | 2514195 | B | 11/2014 |
| GB | 2583232 | A | 10/2020 |
| GB | 2557397 | B | 8/2021 |
| GB | 2600258 | | 4/2022 |
| MX | 2011008597 | A | 9/2011 |
| PL | 426008 | A1 | 1/2019 |
| PL | 430499 | A1 | 7/2020 |
| RU | 2424419 | C1 | 7/2011 |
| RU | 2588501 | C2 | 6/2016 |
| RU | 182236 | U1 | 8/2018 |
| WO | 0026501 | A1 | 5/2000 |
| WO | 03004819 | A2 | 1/2003 |
| WO | 2008079486 | A1 | 7/2008 |
| WO | 2010096417 | A2 | 8/2010 |
| WO | 2012090056 | A2 | 7/2012 |
| WO | 2013033208 | A1 | 3/2013 |
| WO | 2014098885 | A1 | 6/2014 |
| WO | 2014110382 | A1 | 7/2014 |
| WO | 2014210283 | A1 | 12/2014 |
| WO | 2016081287 | A1 | 5/2016 |
| WO | 2016171666 | A1 | 10/2016 |
| WO | 2018005740 | A1 | 1/2018 |
| WO | 2018057361 | A1 | 3/2018 |
| WO | 2018085102 | A1 | 5/2018 |
| WO | 2018102196 | A1 | 6/2018 |
| WO | 2018147833 | A1 | 8/2018 |
| WO | 2019094044 | A1 | 5/2019 |
| WO | 2019147285 | A1 | 8/2019 |
| WO | 2019164492 | A1 | 8/2019 |
| WO | 2019164499 | A1 | 8/2019 |
| WO | 2020005252 | A1 | 1/2020 |
| WO | 2020018110 | A1 | 1/2020 |
| WO | 2020068037 | | 4/2020 |
| WO | 2021011013 | A1 | 1/2021 |
| WO | 2021021203 | A1 | 2/2021 |
| WO | 2021034325 | A1 | 2/2021 |
| WO | 2021076141 | A1 | 4/2021 |
| WO | 2021173161 | A1 | 9/2021 |

OTHER PUBLICATIONS

International Preliminary Report on Patentability in PCT/US2019/068493, date mailed Jun. 30, 2022.

International Preliminary Report on Patentability in PCT/US2019/068497, date mailed Jun. 30, 2022.

International Preliminary Report on Patentability in PCT/US2019/019210, date mailed Nov. 22, 2019.

International Preliminary Report on Patentability in PCT/US2019/058904, date mailed May 3, 22.

International Preliminary Report on Patentability in PCT/US2019/056814, date malled Apr. 19, 22.

Fripp, Novel Expanding Metal Alloy for Non-Elastomeric Sealing and Anchoring, Research Paper, Oct. 3, 2022, 8 pages, Society of Petroleum Engineers, SPE-210273-MS.

First Examination Report in SA Application No. 522441072 dated May 29, 2023.

International Search Report and Written Opinion dated May 20, 2020, issued in related PCT/US2019/047529.

Tao, Solid expandable tubular patching technique for high-temperature and high-pressure casing damaged wells, Research Paper, Jun. 2015, pp. 408-409, Petroleum Exploration and Development, vol. 42, Issue 3.

(56) References Cited

OTHER PUBLICATIONS

Search Report in NL Application No. 2032583 dated, Aug. 31, 2023.
Examination Report in GB Application No. GB2205332.6, dated Sep. 7, 2023.
International Search Report and Written Opinion date mailed Feb. 10, 2021; International Application No. PCT/US2020/034887.
International Search Report and Written Opinion mailed Aug. 2, 2018, International PCT Application No. PCT/US2017/061307.
International Search Report and Written Opinion mailed Nov. 19, 2018; International PCT Application No. PCT/US2018/019337.
Denmark Examination Report and Search Report date mailed Mar. 16, 2021, Denmark Application No. PA202070389.
International Search Report and Written Opinion dated Jul. 8, 2020, issued in related International Application No. PCT/US2019/056814.
International Search Report and Written Opinion for corresponding PCT International Application No. PCT/US2019/068497; mailed Sep. 17, 2020.
International Search report and Written Opinion for corresponding International Patent Application No. PCT/US2019/062225, mailed Aug. 11, 2020.
International Search report and Written Opinion issued in related PCT/US2019/068493 issued Sep. 15, 2020.
Nemisis Annulus Swellable Packer, Weatherford, Swellable Products, 2009-2011.
International Search Report and Written Opinion date mailed Nov. 22, 2019; International PCT Application No. PCT/US2019/019210.
Dutch Search Report issued in NL 2026726, dated Aug. 13, 2021.
International Search Report and Written Opinion in PCT/US2020/066193, mailed Sep. 8, 2021.
Search Report and Written Opinion issued in NL2026329, dated Aug. 13, 2021.
Written Opinion and Search Report in SG Appln No. 11202000316S, dated Aug. 30, 2021.
Dutch Search Report in NL Appln No. 2026737, dated Aug. 13, 2021.
Examination Report in GCC Appln No. GC 2020-39914, dated Jul. 29, 2021.
Office Action in CA AppIn No. 3,070,929, dated Jul. 9, 2021.
International Search Report and Written Opinion in PCT/US2019/042074 mailed Apr. 10, 2020.
Search Report in NL AppIn No. 2025837, dated Sep. 23, 2021.
Office Action in CA Application No. 3,070,929 dated Nov. 19, 2021.
International Search Report and Written Opinion in PCT/US2019/017538, mailed Nov. 11, 2019.
Examination Report in GB AppIn No. 2010931.0 dated, Jan. 18, 2022.
International Search Report and Written Opinion in PCT/US2020/065539, mailed Aug. 30, 2021.
International Search Report and Written Opinion in PCT/US2019/058904, mailed Jul. 23, 2020.
International Search Report and Written Opinion in PCT/US2019/044542, mailed Apr. 28, 2020.
Examination Report in GCC Application No. GC 2020-40201, mailed Aug. 31, 2021.
French Search Report issued in FR Appln No. FR2006166, dated May 30, 2022.
International Search Report and Written Opinion in PCT/US2021/048628 dated May 19, 2022.
International Search Report and Written Opinion in PCT/US2021/027245 mailed Jan. 10, 2022.
International Search Report and Written Opinion in PCT/US2021/032983, mailed Feb. 10, 2022.
Netherlands Search Report in Application No. 2026573 dated Aug. 20, 2021.
Russian Office Action in RU Application No. 2021121198, mailed Nov. 25, 2021.
GC Examination Report in GC Application No. 2019-38908, mailed Nov. 4, 2020.
GC Examination Report in GC Application No. 2020-40475, mailed Nov. 25, 2021.
MY Search Report in MY Application No. PI2020003430, mailed May 26, 2022.
GB Examination Report in Application No. 2010931.0 dated Apr. 5, 2022.
DK Examination Report in Application No. PA 202070389, mailed Oct. 20, 2021.
Ellison, et al. "Comparative evaluation of microwave and conventional gasification of different coal types: Experimental reaction studies", Fuel, 321 (2022), 124055, 10 pgs.
Ellison, et al. "Activated carbon supported Ni, Fe, and bimetallic NiFe catalysts for COx-free H2 production by microwave methane pyrolysis", International Journal of Hydrogen Energy, 55 (2024), 1062-1070.
Ellison, et al. "Dielectric characterization of bentonite clay at various moisture contents and with mixtures of biomass in the microwave spectrum", Journal of Microwave Power and Electromagnetic Energy, 2018, vol. 52, No. 1, 3-15.
Office Action dated Nov. 17, 2023 for U.S. Appl. No. 16/964,430.
Examiner's Report mailed Jun. 27, 2024 for Canadian Patent Application No. 3,139,190.
Examination Report in GB 2306720.0, mailed May 14, 2024.
International Search Report and Written Opinion mailed Sep. 12, 2024 in PCT/US2023/086272.
Written Opinion mailed Feb. 6, 2025 in Singaporean Patent Application No. 11202112174W.
Search Report mailed Nov. 29, 2024 in Malaysian Patent Application No. PI 2021006599.
Examination Report mailed May 6, 2026 in Saudi Arabian Patent Application No. 1120241277.

* cited by examiner

EXPANDABLE METAL SEALANT WELLBORE CASING PATCH

BACKGROUND

In downhole wellbore environments, well casing can be damaged, e.g. during well development and during production due to corrosion and erosion or perforations in a well casing that were perforated in a wrong location or perforations in well location that is no longer needed or desirable for production. As such, there is a need to patch damaged well casing in downhole well environments. Casing patches are commonly used in the well services industry to repair damaged casing. Casing patches currently in use utilize blank pipes, i.e. or deformable metal pipes or plastic pipes, which requires sophisticated expansion techniques, and elastomers to achieve a seal. However, to create a case patch using the aforementioned materials is expensive and requires the downhole casing to be in good condition, which obviously defeats the purpose of needing a casing patch and, therefore, limits the application of these materials. Furthermore, due to the inadequacies of the aforementioned materials and conditions in downhole well environments the seal is unreliable, temporary, and can significantly reduce the Internal Diameter (ID) of production tubing.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Presented herein is a disclosure of a simpler, more reliable, less expensive, effective system, method, and apparatus for repairing damaged well casing in a downhole environment. Specifically, a metal sealant, expandable in response to chemical reaction, presented herein replaces traditional methods, such as elastomers and deformable metal, to repair damaged well casing. A casing patch can be created by placing a metal sealant over a tubular, i.e. mandrel, and ran downhole. Once in a desired location, the casing patch can be anchored by a means of weighting and/or a means of expansion, e.g. using splits and/or a packer. Once anchored, fluid can be pumped downhole causing the metal sealant to chemically react, to expand, and to create a pressure tight seal against the casing in the well. The seal acts as a pressure barrier as well as provides additional anchoring force for the tubular.

Figure 1:
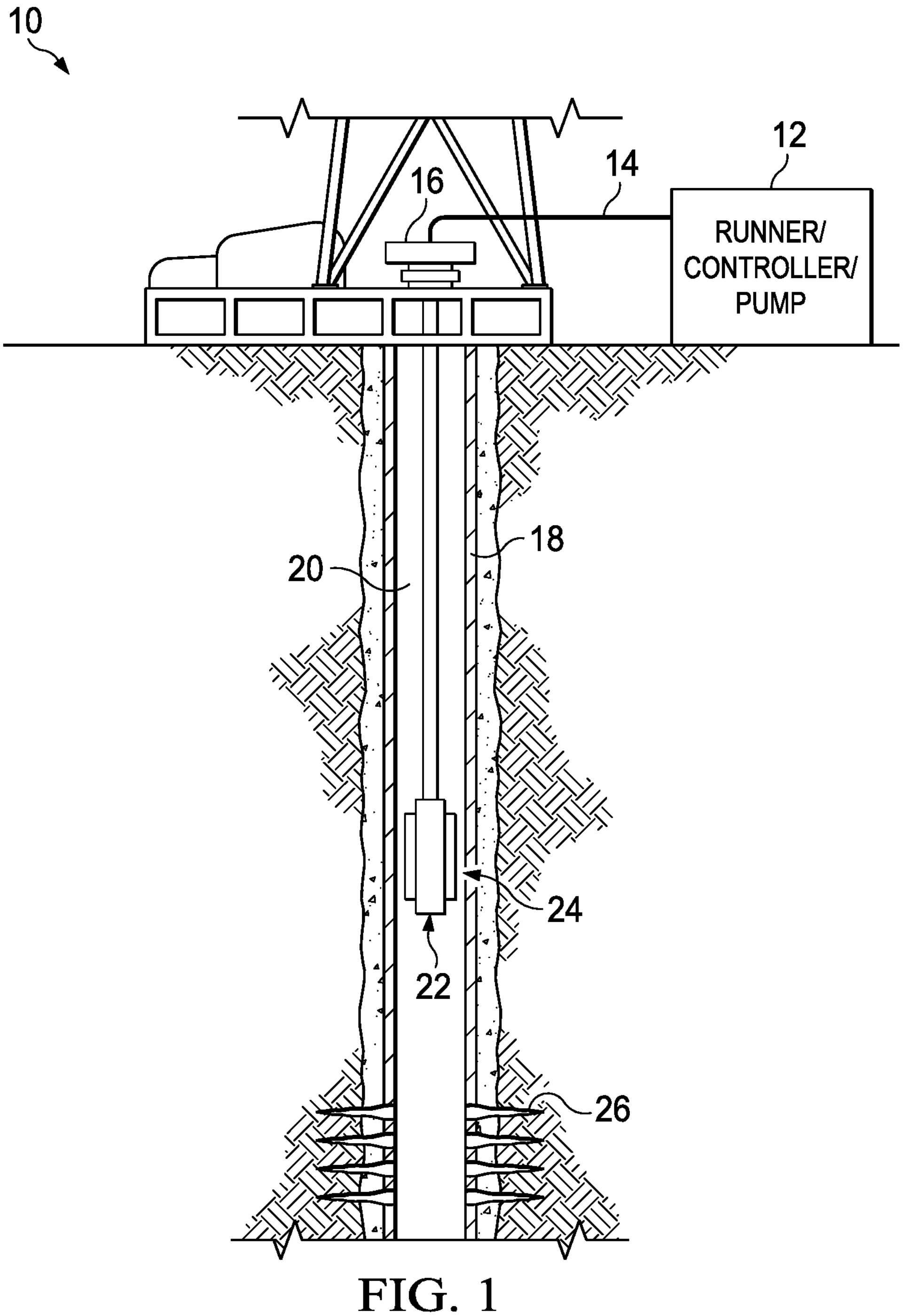
FIG. 1 is an illustration of a diagram of a well site where service operations are performed, in accordance with certain example embodiments.

Referring now to FIG. 1, illustrated is a diagram of a well site where service operations are performed, in accordance with certain example embodiments, denoted generally as 10. The well site 10 includes a runner controller and pump 12, an oilfield tubular 14, a well head 16, well casing 18, wellbore 20, tool 22, casing patch 24, and perforations 26 formed in the well casing 18 and wellbore 20. The tool string 14 can be ran downhole to a particular location. For example, a reservoir accessible through the perforations 26 may no longer produce or may produce unwanted fluid, such as water. The tool 22 can be positioned in proximity within the ID of the well casing 18 and the casing patch 24 attached thereto used to seal the perforated section of the well casing 18. The casing patch 24 comprises a metal sealant. In an embodiment, the tool 22 can include a packer or packers with the packer(s) used to temporarily anchor the casing patch 24 by applying a predetermined amount of force to the casing patch 24. The predetermined amount of force can be defined as an amount of force necessary to expand the casing patch 24 so that an outer diameter of the casing patch 24 is equal to or approximately equal to the ID of the well casing 18. In another embodiment, the tool 22 can include slips configured to temporarily anchor the casing patch 24 in position by using the weight of the slips. In some embodiments, the casing patch 24 can be anchored at a location of the wellbore 20 by positioning the casing patch 24 approximate to a joint where the ID of the well casing 18 changes to an ID approximate to or equal to the casing patch 24. In some embodiments, elastomers and deformable metal pipes or plastics can be used to facility the anchoring process. Water-based wellbore fluids proximate the casing patch 24 cause the metal sealant to chemically react, to expand, and to harden. In cases where the wellbore has insufficient water-based wellbore fluids proximate the casing patch 24, then once the casing patch 24 is anchored, water or fluid carrying water can be pumped downhole causing the metal sealant to expand and harden. The expanding metal expands into the damaged section of well casing 18 and coalesces with the damaged section of well casing 18.

Figure 2A:
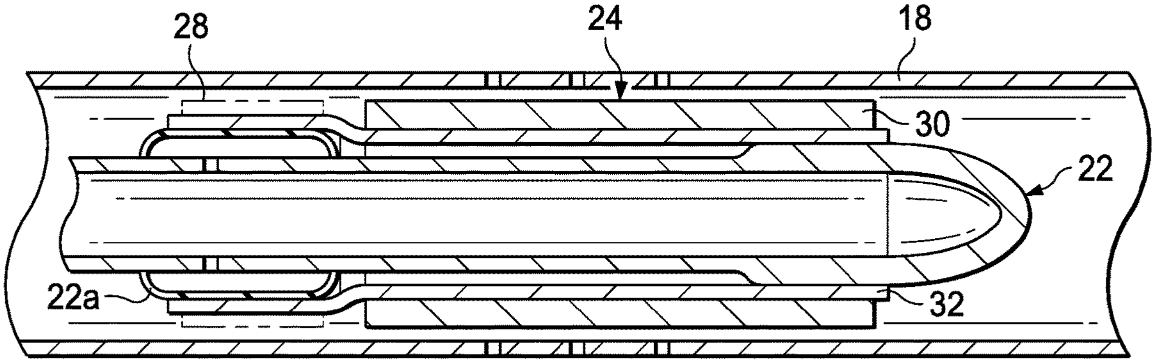
FIGS. 2A-2C are illustrations of a positioned casing patch (2A), an anchored for hydrolysis reaction anchored patch (2B), and a hydrated casing patch (2C), respectively, in accordance with certain example embodiments.
Figure 2B:
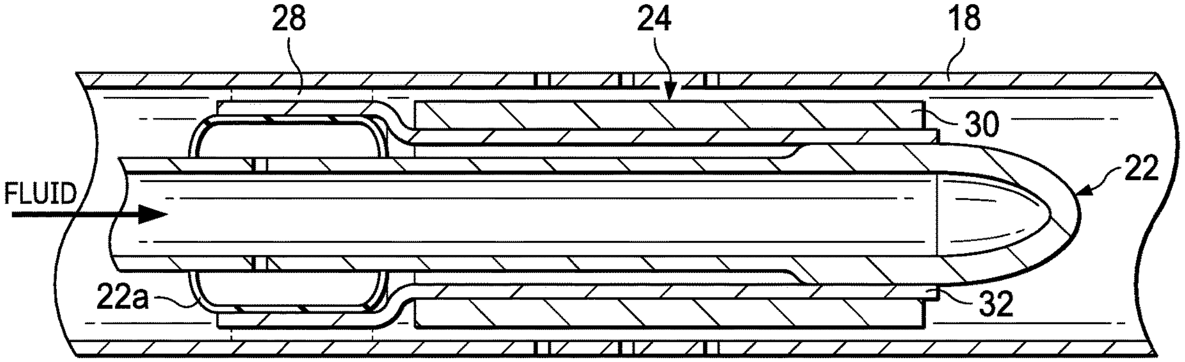
Figure 2C:
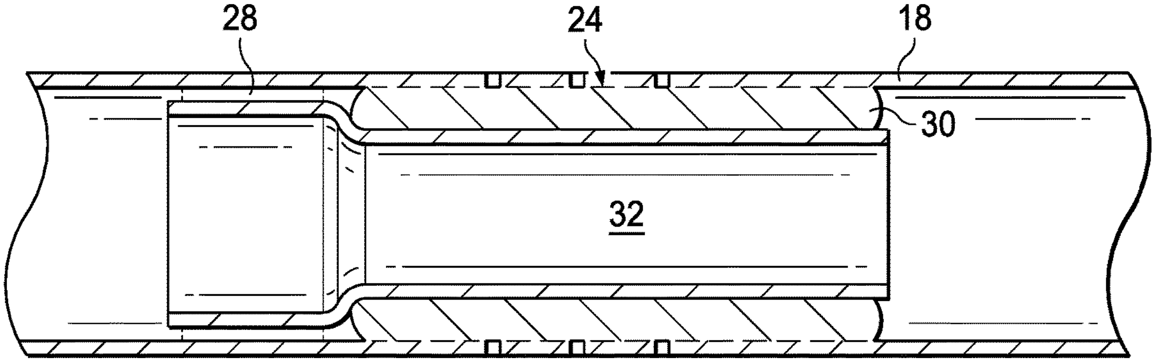

Referring now to FIGS. 2A-2C, illustrated are a positioned, an anchored for chemical reaction, and a reacted casing patch 24, respectively, according to certain example embodiments. In FIG. 2A, the setting tool 22 is configured to secure the casing patch 24. For example, the dimensions, in relation to the casing patch, of the tool 22 are such that the tool 22 and casing patch 24 create a secure coupling. The tool 22 includes a packer 22*a*. The casing patch 24 includes an elastomer 28, or alternatively a deformable metal or plastic, a metal sealant 30 having a predetermined thickness, and a base 32. Although, it should be understood that the elastomer is optional. However, the elastomer can be used to protect an undamaged section of well casing 18. The base 32 includes a first section having a dimension greater than a second section. The packer 22*a* can be activated from the runner controller 12 whereupon activation a predetermined amount of force is applied to the first section of the base 32 which acts to anchor the first section of the base 32 to the well casing 18, see FIG. 2B. At this point, $H_2O$ can be pumped downhole from the pump 12 creating the chemical reaction with the metal sealant 30 causing the metal sealant 30 to expand and harden, see FIG. 2C. The setting tool 22 can be removed from the wellbore 20 at any time after setting of the patch.

In should be understood that the base 32 may not be necessary in all applications. In another option, the base 32 can be constructed from a degradable material, such as a degradable metal or a degradable polymer. The degradable material reacts at a slower rate than the expanding metal so that the metal expands and creates the seal before the degradable material degrades and loses structural support. For example, the expanding metal can form its seal at 2× the rate to 100× the rate that the degradable material takes to degrade. Once the expanded metal has formed its seal, then the degradable supporting materials can degrade and allow for a greater flow area.

Figure 3A:
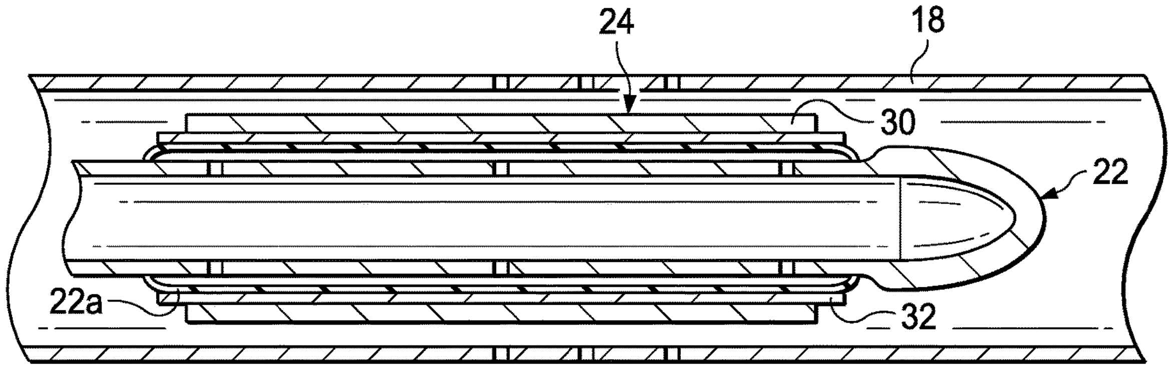
FIG. 3A-3C is an illustration of a positioned casing patch (3A), an anchored for hydrolysis reaction casing patch (3B), and a hydrated casing patch (3C), respectively, in accordance with certain example embodiments.
Figure 3B:
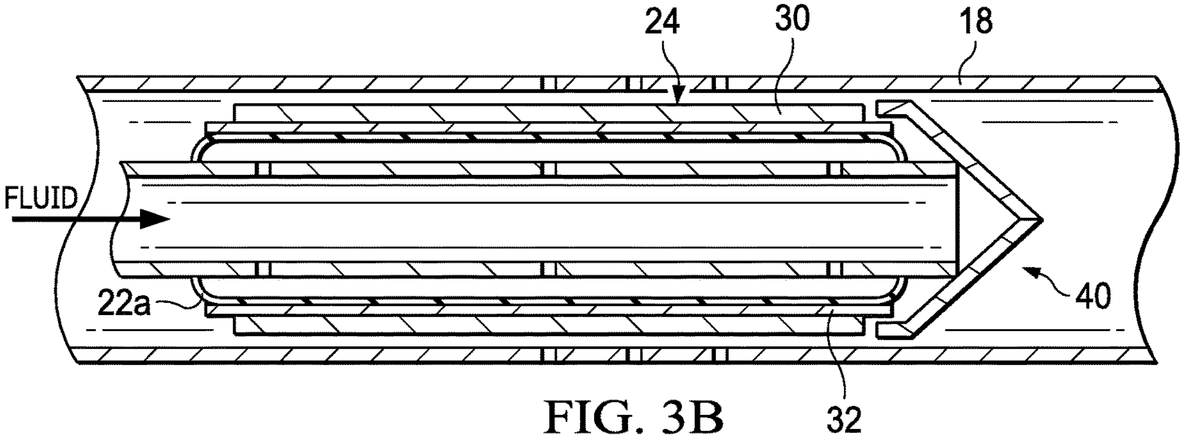
Figure 3C:
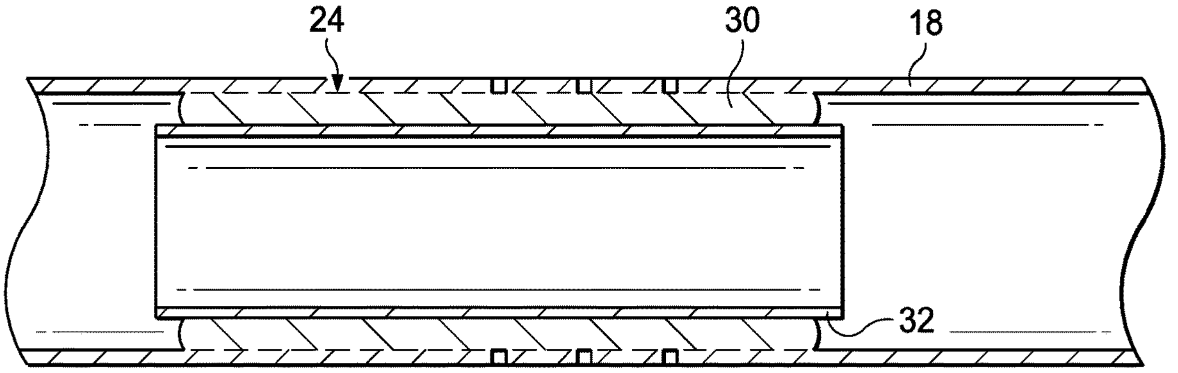

Referring now to FIGS. 3A-3C, illustrated are a positioned, an anchored for chemical reaction, and an expanded casing patch 24, respectively, according to certain other example embodiments. In FIG. 3A, a series of packers 22*a* are used to position the casing patch 24 without necessarily anchoring the casing patch 24 to the well casing 18. However, the running tool 22 can be weighted and/or elsewhere anchored in the well casing 18 providing the casing patch 24 with the stability needed to react, expand, and seal. In FIG. 3B, splits 40 can be configured to secure the casing patch 24. For example, the dimensions, in relation to the casing patch 24, of the tool 22 are enough to secure the casing patch 24 to the tool 22. The sheer weight of the splits 40 can be enough to act as the stabilizer or anchor needed to react, expand, and seal the metal sealant 30. At this point, the water-based fluid can be pumped downhole from the pump 12 creating the chemical reaction with the metal sealant 30 causing the metal sealant 30 to expand and to harden, see FIG. 3C. Alternatively, the metal sealant 30 can react with the water-based fluid that is already existing within the wellbore. The tool 22 can be removed from the wellbore 20 at any time after the installation process, but preferably after the metal sealant has hardened.

As previously stated, the predetermined amount of force can be defined as an amount of force necessary to expand the casing patch 24, i.e. the first section, so that an outer diameter of the casing patch 24 is equal to or approximately equal to the ID of the well casing 18. The predetermined thickness of the metal sealant 30 can be determined by the diameter of the metal sealant 30 after expanding and hardening and the ID of the well casing 18. The metal sealant 30 should be designed in such away that is affective at creating a seal without causing additional damage to the well casing 18. Obviously, the dimensions of the tool, the predetermined amount of force, and the predetermined thickness are determined based on the ID of the well casing.

Figure 4:
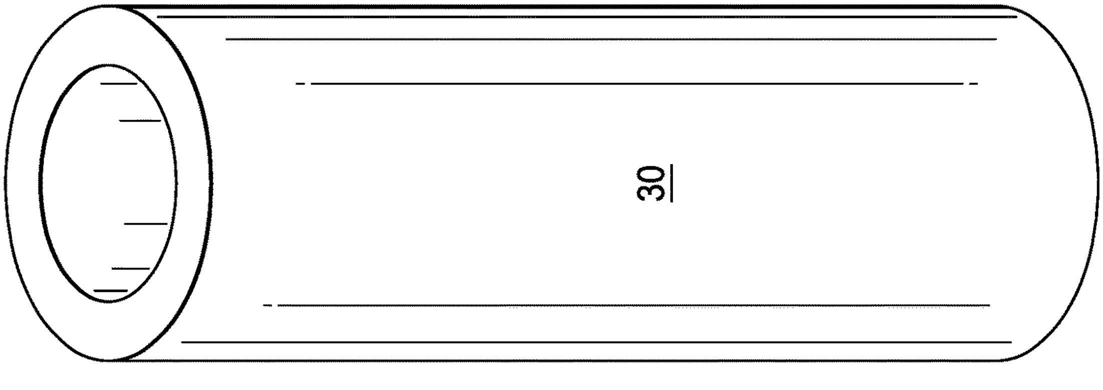
FIG. 4 is an illustration of a well casing, metal sealant, and base, in accordance with example embodiments.

Referring now to FIG. 4, illustrated is a well casing 18, metal sealant 30, and base 32, according to certain example embodiments. In this embodiment, the metal sealant 30 is illustrated with the unreacted metal sealant 30A and reacted metal sealant 30B.

The compounds and reactions of the metal sealant can be defined by the following equation: Metal+water→Metal hydroxide+H2 gas.

The metal hydroxide forms a hard cement-like barrier. The metal can be any metal that forms this reaction but is preferably magnesium, aluminum, calcium, or alloys that contain those metals. The chemical reactions for these preferred metals are defined by the following equations:

$$Mg+2H_2O \rightarrow Mg(OH)_2+H_2 \quad \text{Eq. (1)}$$

$$Al+3H_2O \rightarrow Al(OH)_3+3/2H_2 \quad \text{Eq. (2)}$$

$$Ca+H_2O \rightarrow Ca(OH)_2 \quad \text{Eq. (3)}$$

Equation 1 is a hydration reaction that uses magnesium metal, where Mg(OH)2 is a hard cement-like barrier. Equation 2 is a hydration reaction that uses aluminum metal. Equation 3 is a hydration reaction that uses calcium metal, where Ca(OH)2 is known as portlandite. The hydrated metals are considered to be relatively insoluble in water. The water-based chemical reaction of any metal can create a metal hydroxide. The metals described above are alkaline earth metal (Mg and Ca) or a transition metal (Al) used in the hydrolysis reaction. However, other alkaline or transition metals can be used.

In an embodiment, the material used in the hydrolysis reaction is a magnesium alloy. The alloy elements to the magnesium can be at least one selected from the group comprising Al, Zn, Mn, Zr, Y, Nd, Gd, Ag, Ca, Sn, and RE. In some embodiments, the alloy is further alloyed with a dopant, such as Ni, Fe, Cu, Co, Ir, Au, and Pd, that accelerates the chemical reaction. In some embodiments, the alloy is alloyed with a dopant, such as Ga, Mg, that inhibits the formation of a passivation film that could limit the reaction. The metal alloy can be constructed in a solid solution process where the elements are combined with the molten metal or metal alloy. Alternatively, the metal alloy could be constructed with a powder metallurgy process. The metal can be heat treated with a precipitation process or a tempering process in order to change the size and distribution of the metal grains.

In some embodiments, the starting metal can be a metal oxide. For example, calcium oxide (CaO) with water produces calcium hydroxide in an energetic reaction. Due to the higher density of calcium oxide, this can have a 260% volumetric expansion where converting 1 mole of CaO goes from 9.5 cc to 34.4 cc of volume. In one variation, the metal sealant is formed in a serpentine reaction. Additional ions can be added to the reaction, including silicate, sulfate, aluminate, phosphate. The metal can be alloyed to increase the reactivity or to control the formation of oxides.

Figure 5:
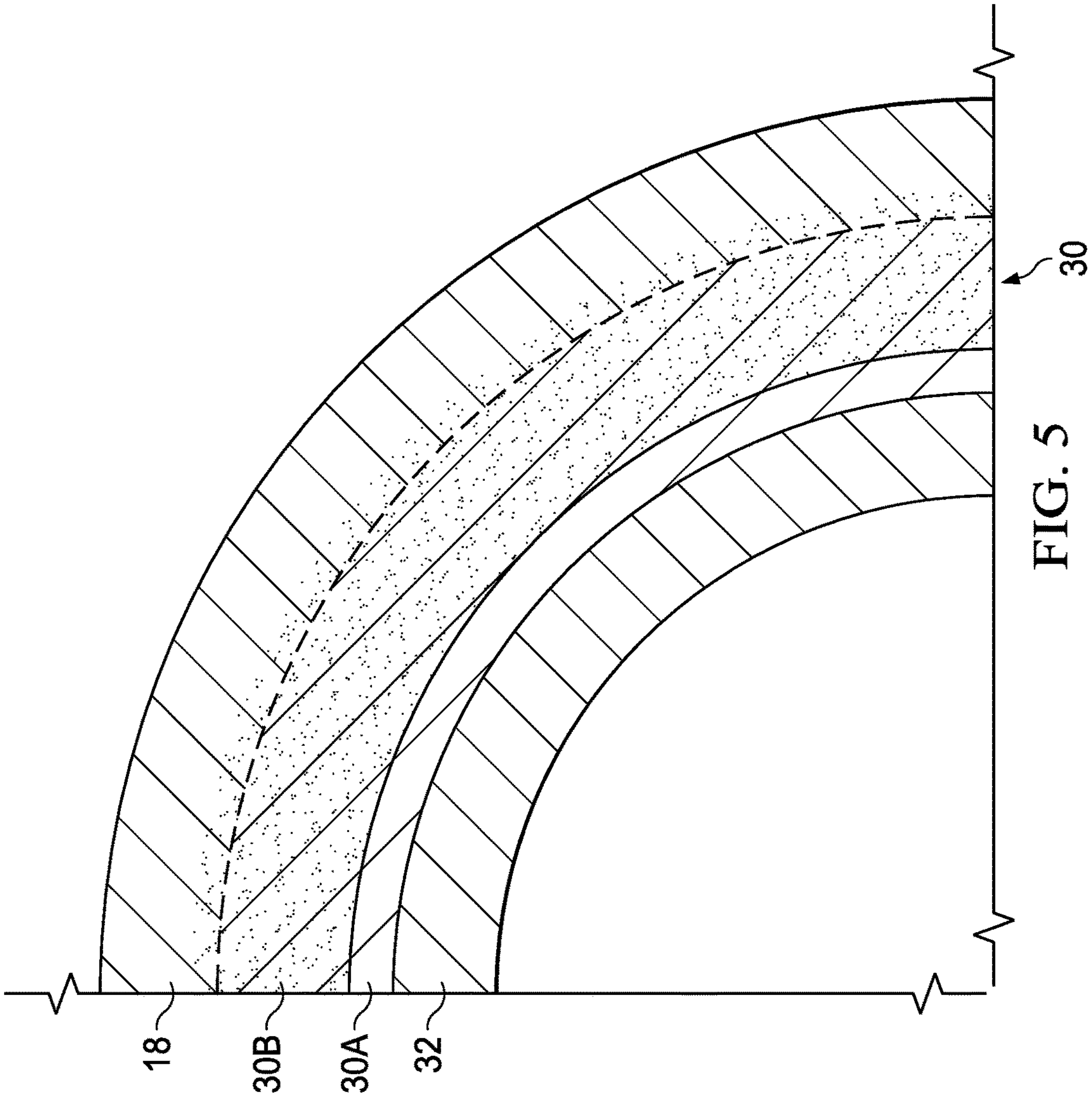
FIG. 5 is an illustration of a metal sealant manufactured in a tubular shape and with a predetermined thickness, according to certain example embodiments.

Referring now to FIG. 5, illustrated is a metal sealant 30 manufactured in a tubular shape and with a predetermined thickness, according to certain example embodiments. The metal sealant 30 can be manufactured to many different shapes with an adequate volume of material needed to create a proper seal in the certain settings. The shape can be a single long tube, multiple short tubes, ring or series of rings. The metal sealant 30 can be manufactured to have different sections, such as, alternating steel, expandable (swellable) rubber, and expandable metal rings. Coatings (such as paint or polymer) can be used to delay reactions. Additionally, non-expanding components can be added into the manufacturing process to create a metal sealant 30 with non-expanding components. For example, ceramic, elastomer, glass, or non-reacting metal components can be embedded in the metal sealant 30 through the manufacturing process. Alternatively, or in addition thereto, non-expanding components can be coated on the surface of the metal sealant 30.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a metal patch for patching a downhole well casing, the metal patch comprising: a metal sealant having a shape congruent with a section of the downhole well casing and transition-able from a first state to a second state in response to a chemical reaction with water; wherein the metal sealant in response to the chemical reaction with water expands;

Clause 2, the metal patch of clause 1 wherein the metal sealant is one of an alkaline earth metal and a transition metal;

Clause 3, the metal patch of clause 1 wherein the metal sealant is a compound of magnesium or aluminum and at least one alloying element, wherein the at least one alloying element is selected from a group consisting of Al, Zn, Mn, Zr, Y, Nd, Gd, Ag, Ca, Sn, and RE;

Clause 4, the metal patch of clause 3 wherein the metal sealant is alloyed with a dopant that promotes corrosion;

Clause 5, the metal patch of clause 3 wherein the at least one alloying element is an element that inhibits passivation;

Clause 6, the metal patch of clause 1 wherein the first state is one of: $Mg+2H_2O$; $Al+3H_2O$; and $Ca+H_2O$;

Clause 7, the metal patch of clause 1 wherein the second state contains a solid that consists of one of: $Mg(OH)_2$; $Al(OH)_3$; and $Ca(OH)_2$;

Clause 8, a method of using a metal patch for patching a well casing downhole in a wellbore environment, the method comprising: assembling a metal sealant with a base, wherein the metal sealant and the base have a diameter smaller than the diameter of a section of the well casing; coupling the assembled metal sealant and base to the well casing using a downhole running tool and expandable device; and wherein the metal sealant is transition-able from a first state to a second state in response to chemical reaction with a water-based fuid; wherein the metal sealant in response to chemical reaction with water expands and hardens;

Clause 9, the method of clause 8 wherein the metal sealant is one of an alkaline earth metal, a transition metal, and a metal oxide;

Clause 10, the method of clause 8 wherein the metal sealant is a compound of magnesium and at least one alloy, wherein the at least one alloy is selected from a group consisting of Al, Zn, Mn, Zr, Y, Nd, Gd, Ag, Ca, Sn, and RE;

Clause 11, the method of clause 10 wherein the at least one alloy is alloyed with a dopant that promotes corrosion;

Clause 12, the method of clause 10 wherein the at least one alloy is alloyed with a dopant that inhibits passivation;

Clause 13, The method of clause 9 wherein the first state is one of: $Mg+2H_2O$; $Al+3H_2O$; and $Ca+H_2O$ and wherein the second state is one of: $Mg(OH)_2+H_2$; $Al(OH)_{3+3/2}$ $H_2$; and $Ca(OH)_2$;

Clause 14, a system for patching a downhole well casing, the system comprising: a base having a shape congruent with a section of the well casing; a metal sealant couple-able with the base and having a shape congruent with a section of the downhole well casing and transition-able from a first state to a second state in response to hydrolysis; and wherein the metal sealant in response to hydrolysis expands and hardens;

Clause 15, the system of clause 14 wherein the metal sealant is one of an alkaline earth metal, a transition metal, and a metal oxide;

Clause 16, the system of clause 14 wherein the metal sealant is a compound of magnesium and at least one alloy, wherein the at least one alloy is selected from a group consisting of Al, Zn, Mn, Zr, Y, Nd, Gd, Ag, Ca, Sn, and RE;

Clause 17, the system of clause 16 wherein the at least one alloy is alloyed with a dopant that promotes corrosion;

Clause 18, the system of clause 16 wherein the at least one alloy is alloyed with a dopant that inhibits passivation;

Clause 19, the system of clause 14 wherein the first state is one of: $Mg+2H_2O$; $Al+3H_2O$; and $Ca+H_2O$; and Clause 20, the system of clause 14 wherein the second state is one of: $Mg(OH)_2+H_2$; $Al(OH)_3+3/2\ H_2$; and $Ca(OH)_2$.

What is claimed is:

1. A method for patching a well casing downhole in a wellbore environment, the method comprising:

assembling a casing patch by disposing a metal sealant adjacent to and around a base, wherein the base and metal sealant each have a tubular shape; wherein the metal sealant and the base each have a diameter smaller than a diameter of a section of the well casing and the diameter of the casing patch is also smaller than the diameter of the section of the well casing; wherein the diameter of the metal sealant is larger than the diameter of the base; wherein the base has an axial length greater than an axial length of the metal sealant and a portion of the axial length of the base extends past the axial length of the metal sealant;

coupling the assembled casing patch to the well casing with a downhole running tool and an expandable device; and securing the casing patch to the well casing with the downhole running tool and the expandable device by activating the expandable device and thereby applying a predetermined amount of force to the portion of the axial length of the base extending past the axial length of the metal sealant; wherein the force anchors the portion of the axial length of the base extending past the axial length of the metal sealant to the well casing;

then contacting the metal sealant with a water-based fluid; and thereby transitioning the metal sealant from a first state to a second state in response to a hydration reaction with the water-based fluid; wherein the first state comprises a single metal, a metal alloy, or a metal oxide; wherein the second state is a hydroxide reaction product of the hydration reaction;

wherein the second state comprises a larger volume than the first state; and wherein the hydroxide reaction product patches the well casing by forming a seal against the well casing.

2. The method of claim 1 wherein (i) the first state comprises the single metal and the single metal is an alkaline earth metal or a transition metal; or (ii) the first state comprises the metal alloy or the metal oxide and the metal alloy or metal oxide comprises an alkaline earth metal, a transition metal, or a combination of an alkaline earth metal and transition metal.

3. The method of claim 1 wherein (i) the first state comprises the single metal and the single metal is Mg, Al, Zn, Mn, Zr, Y, Nd, Gd, Ag, Ca, Sn, or Re; or (ii) the first state comprises the metal alloy or the metal oxide; and the metal alloy or metal oxide comprises at least one element selected from the group consisting of Mg, Al, Zn, Mn, Zr, Y, Nd, Gd, Ag, Ca, Sn, or Re.

4. The method of claim 1 wherein the first state comprises magnesium.

* * * * *